Oct. 25, 1960     C. J. ESSMANN     2,957,334
CALIBRATING APPARATUS FOR GAUGES AND LIKE INSTRUMENTS
Filed Jan. 31, 1958     2 Sheets-Sheet 1
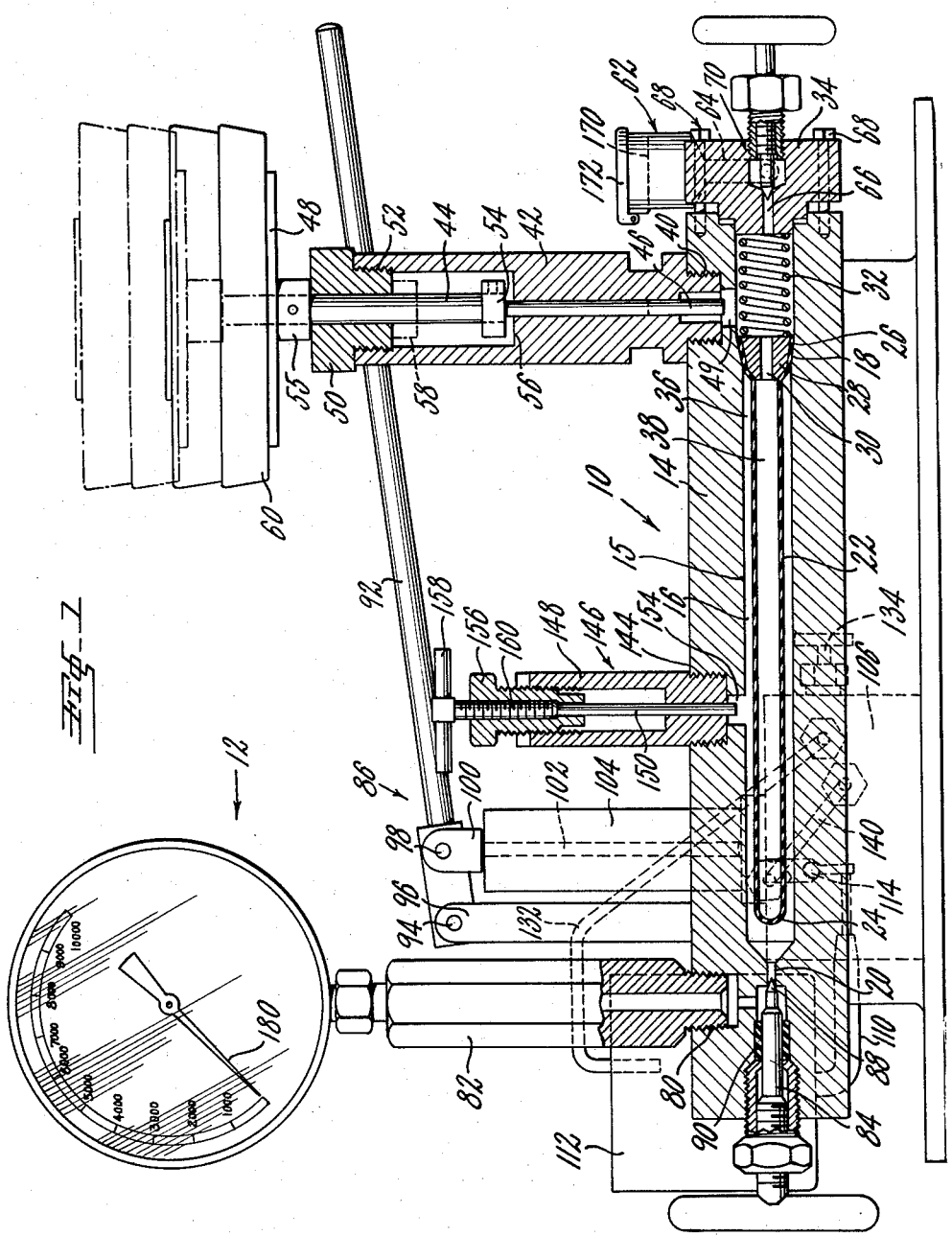
INVENTOR.
CARL J. ESSMANN
BY Oct. 25, 1960    C. J. ESSMANN    2,957,334
CALIBRATING APPARATUS FOR GAUGES AND LIKE INSTRUMENTS
Filed Jan. 31, 1958    2 Sheets-Sheet 2
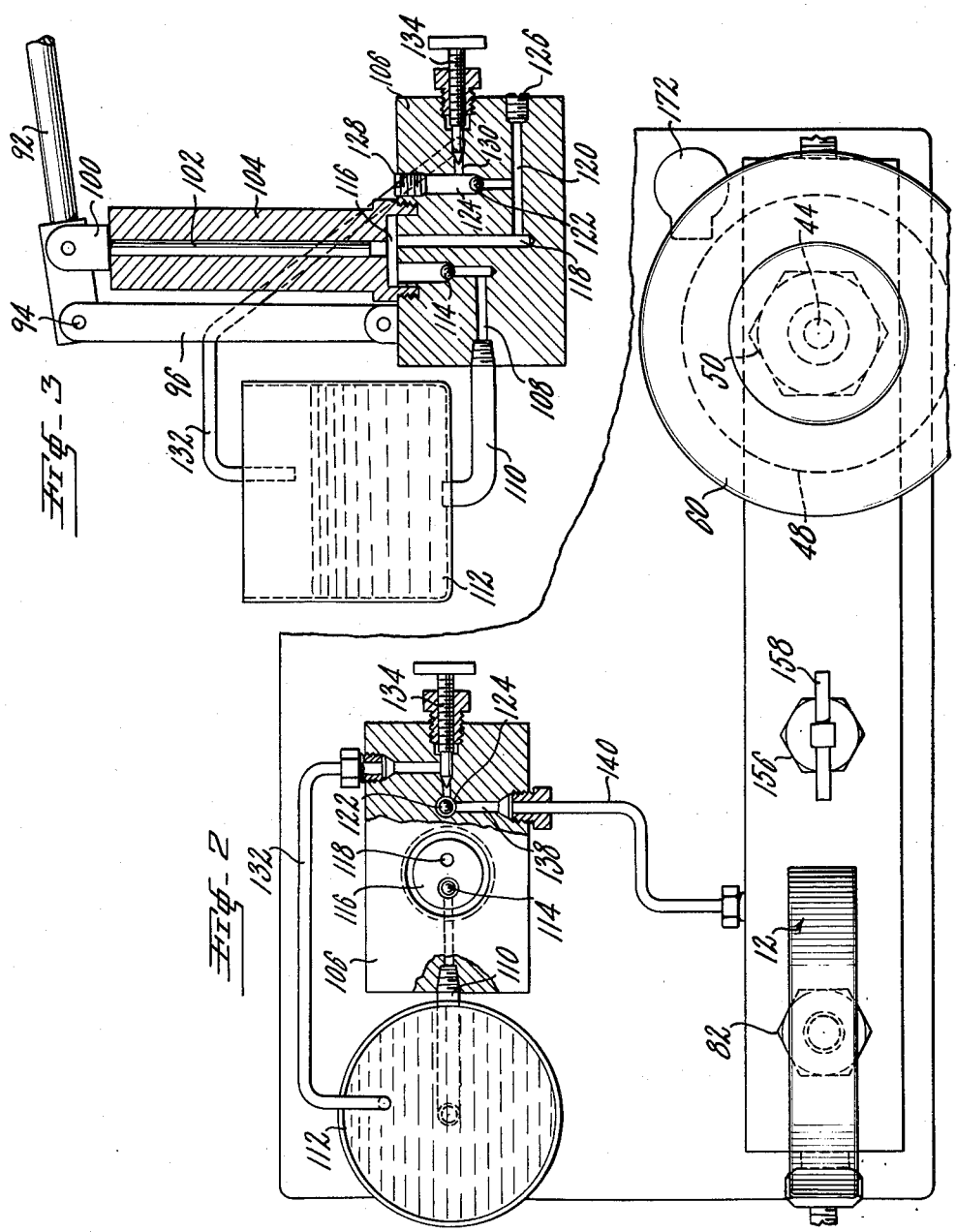
INVENTOR.
CARL J. ESSMANN

United States Patent Office 2,957,334
Patented Oct. 25, 1960

2,957,334

CALIBRATING APPARATUS FOR GAUGES AND LIKE INSTRUMENTS

Carl J. Essmann, Queens Village, N.Y., assignor to Amthor Testing Instrument Co., Inc., Brooklyn, N.Y.

Filed Jan. 31, 1958, Ser. No. 712,346

10 Claims. (Cl. 73—4)

This invention relates to calibrating apparatus and concerns more particularly an apparatus for calibrating pressure gauges.

The invention is more specifically directed to an improved construction for calibrating pressure gauges and has as one of its primary objects to provide means affording extremely arcuate measurement of fluid pressure for calibrating purposes.

A further object of the present invention is to provide means contributing to a highly dependable calibrating apparatus which is sturdy in construction and extremely precise in its operation, in which two fluids are utilized to bring about displacement of weights for calibrating pressure gauges and other instruments employable in gas and hydraulic operations.

A still further important object of the invention is to provide means conducive to a highly sensitive calibrating apparatus, which permits complete evacuation and withdrawal of one of its cooperating fluids without leaving any residue, whereby as a fluid may preferably be chosen an easily evaporatable fluid, such as alcohol, before a calibrating operation for a successive or further pressure gauge takes place.

Yet a further object of the invention resides in the provision of means rendering the possibility of permitting great flexibility in the calibration of various types and dimensions of pressure and like gauges.

Still another object of the invention is to provide means redounding to a very efficacious and easily operable calibrating apparatus construction, which necessitates a minimum number of parts and is compatible with the fluid and conditions under which the pressure gauge or unit to be tested will be ultimately used.

These together with various ancillary objects of the invention, which will later become apparent as the ensuing description progresses, are attained by the present invention, a preferred embodiment of which has been illustrated, by way of example only in the accompanying drawings, wherein:

Fig. 1 is a side elevational view, partly in cross section, of an apparatus for calibrating pressure gauges and embodying the present invention.

Fig. 2 is a top plan view of the apparatus of Fig. 1 with its connected pump assembly shown partly in section.

Fig. 3 is a fragmentary longitudinal sectional detail view of the pump assembly seen in Fig. 2.

With continuing reference to the accompanying drawings wherein like reference numerals designate similar parts throughout the various views, reference numeral 10 generally designates the calibrating or dead weight gauge tester comprising the present invention.

This gauge tester is an instrument for testing pressure gauges, such as are generally indicated by reference numeral 12, and other pressure measuring devices.

The gauge tester 10 includes a housing 14 formed of relatively strong material, being constructed of any suitable metal or alloy generally used for testing instruments. The housing 14 has a chamber 16. The chamber 16 is provided with a tapered surface 18 at one end thereof and with a constricted passage 20 at the other end thereof.

An expandible and contractible, flexible, tubular member 22 is disposed in the chamber 16. The flexible member 22 is preferably constructed of rubber-like material preferably of a composition resistant to the action of oil, alcohol and various other fluids thereon employable in the tester and may be made from a suitable synthetic plastic material, such as a vinyl resin having a plasticizer.

The flexible member 22 has a closed end as at 24 and an enlarged end as at 26 in which a plug 28 having an aperture 30 therethrough is fitted.

A spring 32 engages the plug, and an end piece 34 urges the plug and the enlarged end portion 26 of the flexible member into a fluid-tight engagement with the tapered surface 18 of the housing 14. The flexible member 22 thus divides the chamber 16 into an outer compartment 36 and an inner compartment 38.

Threadedly engaged as at 40 with the housing 14 is a cylinder 42 which communicates with the compartment 38 through the aperture 30. A piston guide 44 is movably mounted within the cylinder 42 and has a piston 46 which extends into the recess 49 within the housing 14, which communicates with the flexible member 22. A weighted platform 48 is mounted on the piston guide 44 outwardly of the end of plug 50 of the cylinder 42, which is threadedly engaged as at 52 in the cylinder forming a seal therefor. A safety collar 54 is mounted on the piston 46 and is adapted to limit movement of the piston 46 from a lower position where the collar is spaced from shoulder 56 to a raised limit position as is shown in phantom lines at 58 where the collar abuts and engages the plug 50. Also secured on the piston guide 44 is a further collar 55 which abuts the plug 50 to limit the lowermost position of platform 48 and piston 46. The platform 48 is adapted to carry one or more suitable weights 60 thereon.

Communicating with the recess 49 is an oil cup 62 forming an oil reservoir. A conduit 64 connects the oil cup with a passage 66.

Screw type fasteners 68 secure the end piece 34 to the housing 14 and a needle valve assembly 70 controls fluid flow from the oil cup 62 to the passageway 66 and thence to the cylinder 42 and flexible member 22. The needle valve assembly 70 is in a normally closed position. Only if oil is to be supplied for replacement or replenishing purposes, valve assembly 70 is opened temporarily. In lieu of oil other liquids or fluids can be employed, such as glycerine, and similar lubricants.

Threadedly engaged as at 80 at the other end of the housing 14 is a fitting 82 to which the gauge 12 to be tested is adapted to be secured. A needle valve assembly 84 may be provided to control flow of fluid from the outer compartment 36 to the fitting 82 and thence to the gauge 12. A pump assembly or fluid supply means generally indicated as at 86 is provided for forcing another fluid such as alcohol, distilled water and like evaporatable liquid or gas into the outer compartment 36. The needle valve assembly 84 includes a needle valve element 88 and a seal 90 for preventing any fluid leakage in certain instances. The pump assembly 86 includes a hand operated lever 92 which is pivoted as at 94 to a standard 96 rising from the housing 106. The hand operated lever has a piston end 100 pivotally connected as at 98. The piston end 100 is connected to a piston rod 102 movable within a pump cylinder 104. The piston rod 102 is mounted in a fluid-tight arrangement within the cylinder 104.

As can be best seen in Fig. 3, the pump assembly further includes pump block 106. Connected to a passageway 108 in the pump block 106 is a conduit 110 connected to a fluid reservoir 112. Within the fluid reservoir any suitable liquid or gas such as alcohol, carbon tetrachloride or the like is disposed.

Actuation of the pump assembly 86 causes upon upstroke of the piston 102 suction to be induced to draw fluid through the passageway 108 past a ball check valve 114 into a channel 116 at the lower portion of the cylinder 104. The downstroke of the piston 102 forces by positive displacement the fluid through the passageways 118 and 120 past a ball check valve 122 into the passageway 124. A drain plug 126 is provided for closing the passageway 120 which opens into the periphery of the pump block 106 as is necessary during machining operations performed on the block 106. A further plug 128 is provided for the passageway 124.

Communicating with the passageway 124 is a further passageway 130 which communicates with a return conduit 132 which is adapted to return fluid to the fluid reservoir 112. A normally closed needle valve 134 is provided for preventing fluid flow from the passageway 124 to the passageway 130 and thence to the return conduit 132.

Communicating with the passageway 124 is a further passageway 138 to which a supply conduit 140 is connected which supply conduit communicates with the chamber 16 and outer compartment 36. Hence, the operation of the pump assembly or like fluid supply means 86 will serve to force alcohol or other suitable gas or liquid under pressure into the outer compartment 36. Further, such fluid will be supplied under pressure to the gauge 12.

Threadedly engaged as at 144 to the housing 14 and communicating with the outer compartment 36 is a fluid release and adjustment assembly 146 which includes a cylinder 148 having a piston 150 mounted therein and threadedly movable into a compartment extension 154 so as to control the effective volume of the outer compartment 36. The piston 150 is controlled through operation of the threaded adjusting plug 156 and handle 158. The piston 150 may have a portion 160 threadedly and rotatably mounted within the plug 156. The variation in the effective volume of the outer compartment 36 will adjust the effective operating position of the piston 46.

In operation, the oil reservoir 62 is preferably filled with a high grade instrument oil to a level as indicated at 170, which may be approximately one-half of an inch from the top 172 of the reservoir 62 or thereabout. A gauge line, not shown, may be provided on the interior of the oil reservoir 62, as desired. Then, the needle valve assembly 70 is opened permitting the cylinder 42, recess 49 and inner compartment 38 to be filled with oil after which the needle valve assembly is closed. Valve assembly 84 is then opened to connect through fitting 82 gauge 12 with compartment 36.

The needle valve assembly 84 is thereafter shifted to a closed position and the gauge 12 to be tested is secured on the fitting 82, then the needle valve 84 is opened, and the pump assembly 86 is actuated to force fluid such as alcohol, under pressure into the outer compartment 36. This will cause the flexible member 22 to contract forcing fluid into recess 49 and forcing the piston 46 to rise raising the collar 55 off plug 50, with collar 54 in a floating position between the shoulder 52 and the plug 50. When collar 54 is in a floating position, the platform 48 may be rotated by hand and a reading on the gauge 12 may be taken which should correspond to indicia on the weight or weights 60. Dependent, of course, on the cross sectional area of the piston 46, the pressure in pounds per square inch afforded by the weight or weights 60 can be calculated. For instance, if the actual weight of the weighted platform 48 and associated piston assembly is 500 lbs. and the piston area is one-tenth of a square inch, a pressure of 5,000 lbs. per square inch will be created on the oil within the flexible member 22 and hence it would be necessary to actuate the pump assembly until fluid is introduced at a pressure of 5,000 lbs. per square inch into the outer compartment 36 and supplied to the gauge 12 concurrently.

If a reading on the gauge is then 5,000 lbs. per square inch, the gauge is correct. Otherwise, the indicia on the gauge are changed to correspond to the needle setting of the needle 180 of the gauge 12 corresponding to the effective weight of the weighted platform 48.

After the gauge 12 has been calibrated, the pressure relief assembly 146 may be actuated to slowly lower the pressure in compartment 36 permitting platform 48 to descend gradually. Thereafter, needle valve assembly 134 will be opened allowing the fluid in the compartment 36 to be returned to the reservoir 112 and the weight or weights 60 may be lifted off the platform 48, as desired.

An accuracy of better than one-tenth of one percent of the actual reading can be obtained, and inaccuracies are only possible through tolerances in the piston diameter and the calibration of the weights and weighted platform. The lowest pressure which can be tested with this instrument corresponds to the weight of the piston and the weighted platform 48.

It is a generally accepted practice to use lubricating or hydraulic oils as fluid for testing gauges and other delicate instruments used in hydraulic operations, but never for gauges used in oxygen or gas systems because of the hazards created in allowing the residues to contaminate the gauges. In this system, a gas or a rapidly evaporatable liquid is used within the compartment 36 and fed to the gauge 12 thus eliminating the possibility of explosions or other undesirable effects resulting from residues left in the gauge.

It is noted that this invention retains the advantages of fluid lubrication by oil of piston 46, while the other fluid, such as alcohol, which is introduced into compartment 36 and gauge 12 does not leave any harmful residue therein. Further any impurities within the gauge or instrument to be calibrated or tested are kept from piston 46 and cylinder 42, thus maintaining a high degree of accurate measuring conditions in the tester device.

This is achieved even though instrument oils having lubricating properties may be used with respect to the piston 46 and within the compartment 38 thus reducing inaccuracies which would result from friction and lack of lubrication of these parts.

Thus, it can be seen that there has been provided a gauge tester of a dead weight type including a housing 14 having a hollow inner wall at 15 forming a chamber 16 therein. There is also disclosed an elongated, expandable and contractible, flexible member 22 disposed in the chamber 16 with a seal being provided between the flexible member 22 and the tapered portion 18 of the chamber 16. There is the pump assembly 86 for supplying fluid under pressure into the outer compartment 36 and a weighted platform assembly for maintaining fluid under pressure within the flexible member 22, whereby contractile pressure will be applied on the flexible member 22 by fluid under pressure in the outer compartment 36 for displacement of fluid in the flexible member to raise the weighted platform to assume a floating position.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A gauge tester comprising a housing having a hollow inner wall forming a chamber therein, an elongated expandable and contractible flexible member disposed in said chamber, means forming a seal between said flexible member and said hollow inner wall preventing flow of fluid from said chamber into said flexible member, a cylinder communicating with said flexible member, a piston movable in said cylinder, a weighted platform supported by said piston, said flexible member and said cylinder being adapted to hold one fluid, means for connecting a gauge to be tested to said chamber, and means for supplying another fluid under pressure to said chamber and the gauge to be tested, whereby contractile pressure will be applied on said flexible member by said other fluid under pressure in said chamber for displacement of said one fluid in said flexible member to raise said piston and said weighted platform so that said piston assumes a floating position in said cylinder, thereby indicating in said gauge equalization of the pressure of said one fluid with the pressure of said other fluid.

2. A gauge tester comprising a housing having a hollow inner wall forming a chamber therein, an elongated expandible and contractible flexible member disposed in said chamber, means forming a seal between said flexible member and said hollow inner wall preventing flow of a first fluid from said chamber into said flexible member, a cylinder communicating with said flexible member, a piston movable in said cylinder, a weighted platform supported on said piston, said flexible member and said cylinder being adapted to hold a second fluid, means for connecting a gauge to be tested to said chamber, and pump means for supplying said first fluid under pressure to said chamber and the gauge to be tested, whereby contractile pressure will be applied on said flexible member by said first fluid under pressure in said chamber for displacement of said second fluid in said flexible member to raise said piston to a floating position in said cylinder to indicate equalization of pressure of said first fluid in said gauge with the pressure of the second fluid on said piston.

3. A gauge tester comprising a housing having a hollow inner wall forming a chamber therein, an elongated expandible and contractible flexible member disposed in said chamber, said chamber having a tapered seal seat, said flexible member having an enlarged end portion, spring means urging said enlarged portion against said seat forming a seal between said flexible member and said housing preventing flow of fluid from said chamber into said flexible member, a cylinder communicating with said flexible member, a piston movable in said cylinder, a weighted platform supported on said piston, said flexible member and said cylinder being adapted to hold one fluid, means for connecting a gauge to be tested to said chamber, and fluid supply means for supplying another fluid under pressure to said chamber and the gauge to be tested, whereby contractile pressure will be applied on said flexible member by said other fluid under pressure in said chamber for displacement of said one fluid in said flexible member to raise said piston and said weighted platform so that said piston assumes a floating position in said cylinder, thereby indicating on said gauge equalization of the pressure of said one fluid with the pressure of said other fluid.

4. The gauge tester of claim 3, including pressure relief means for varying the volume of said chamber to adjust the effective operating position of said piston.

5. A calibrating device for gauges comprising a housing having a hollow inner wall forming a chamber therein, an elongated expandible and contractible flexible member disposed in said chamber, means forming a seal between said flexible member and said hollow inner wall preventing flow of fluid from said chamber into said flexible member, a cylinder communicating with said flexible member, a piston movable in said cylinder, a weighted platform supported on said piston, said flexible member and said cylinder being adapted to hold one fluid, means for connecting a gauge to be tested to said chamber, means for varying the volume of said chamber to adjust the effective operating position of said piston, and pump means for supplying another fluid under pressure to said chamber and the gauge to be tested, whereby contractile pressure will be applied on said flexible member by said other fluid under pressure in said chamber for displacement of said one fluid in said flexible member to raise said piston and said weighted platform to assume a floating position.

6. A testing and calibrating device for gauges comprising a housing having a hollow inner wall forming a chamber therein, an elongated expandible and contractible flexible member disposed in said chamber, dividing said chamber into an outer compartment and an inner compartment, means including a spring urging one end of said flexible member against said inner wall to form a seal between said flexible member and said inner wall preventing flow of a first fluid from said outer compartment into said inner compartment, a cylinder communicating with said flexible member, a piston movable in said cylinder, a weighted platform supported on said piston, said flexible member and said cylinder being adapted to hold a second fluid, means for connecting a gauge to be tested to said outer compartment, and pump means for supplying said first fluid under pressure to said outer compartment and the gauge to be tested, whereby contractile pressure will be applied on said flexible member by said first fluid under pressure in said outer compartment for displacement of said second fluid in said flexible member to raise said weighted platform to assume a floating position.

7. The testing and calibrating device for gauges of claim 3, including hand operated means for varying the volume of said outer compartment to adjust the effective operating position of said piston.

8. The gauge tester of claim 1, wherein said piston is rotatably mounted in said cylinder, said piston having a collar thereon for limiting the position of said piston.

9. A testing and calibrating device for gauges comprising a housing having a hollow inner wall forming a chamber therein, an elongated expandible and contractible flexible member disposed in said chamber, means forming a seal between said flexible member and said hollow inner wall preventing flow of fluid from said chamber into said flexible member, a cylinder communicating with said flexible member, a piston rotatably and vertically movable in said cylinder, a weighted platform supported on said piston, said flexible member and said cylinder being adapted to hold one fluid, a reservoir for supplying fluid to said flexible member, means for connecting a gauge to be tested to said chamber and the gauge to be tested, whereby contractile pressure will be applied on said flexible member by said other fluid under pressure in said chamber for displacement of said one fluid in said flexible member to raise said weighted platform to assume a floating position indicating on said gauge that pressure of said one fluid and pressure of said other fluid have been equalized.

10. A gauge tester comprising a housing having a hollow inner wall forming a chamber therein, an elongated expandible and contractible flexible member disposed in said chamber, said chamber having a tapered seal seat, said flexible means having an enlarged end position, spring means urging said enlarged portion against said seat to form a seal between said flexible member and said hollow inner wall preventing flow of a first fluid from said chamber into said flexible member, a cylinder communicating with said flexible member, a piston rotatably and vetrically movable in said cylinder, a weighted platform supported on said piston, said flexible member and said cylinder being adapted to hold a second fluid, means for varying the volume of said chamber to adjust the effective operating position of said piston, means for connecting a gauge to be tested to said chamber, and pump means for supplying said first fluid under pressure to said chamber and the gauge to be tested, whereby contractile pressure will be applied on said flexible member by said first fluid under pressure in said chamber for displacement of said second fluid in said flexible member to raise said weighted platform so that said piston assumes a floating position in said cylinder, thereby indicating equalization of the pressure of said one fluid with the pressure of said other fluid.

References Cited in the file of this patent

UNITED STATES PATENTS

| | | |
|---|---|---|
| 1,134,316 | Collette | Apr. 6, 1915 |
| 1,154,018 | Hopkins | Sept. 21, 1915 |
| 1,864,906 | Hirsch | June 28, 1932 |
| 2,738,731 | Browne | Mar. 20, 1956 |